Dec. 18, 1928.  
C. P. EISENHAUER  
1,695,542  
WATER SOFTENING APPARATUS  
Filed July 22, 1925  
9 Sheets-Sheet 1

INVENTOR  
CHARLES P. EISENHAUER.  
BY Toulmin + Toulmin,  
ATTORNEYS

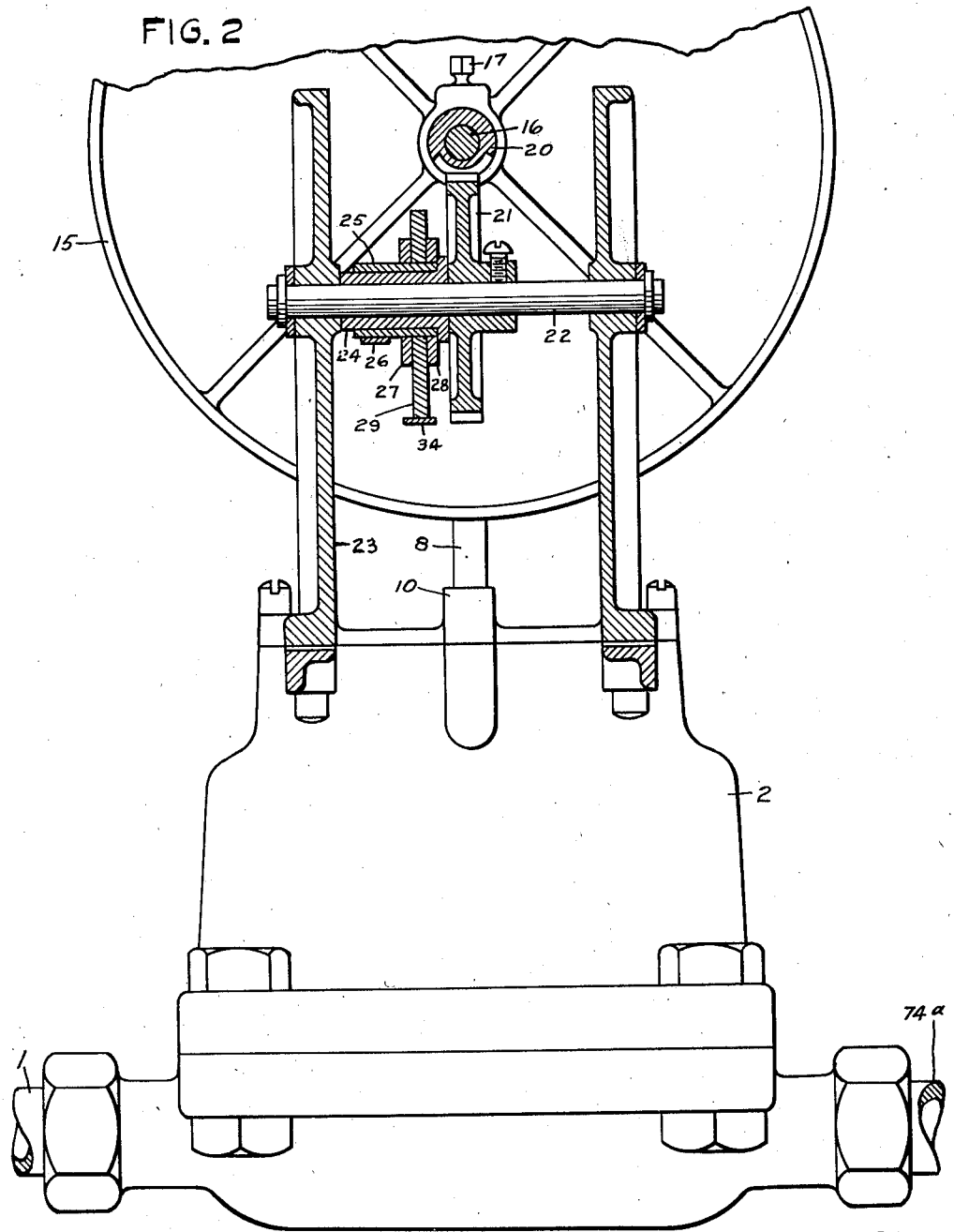

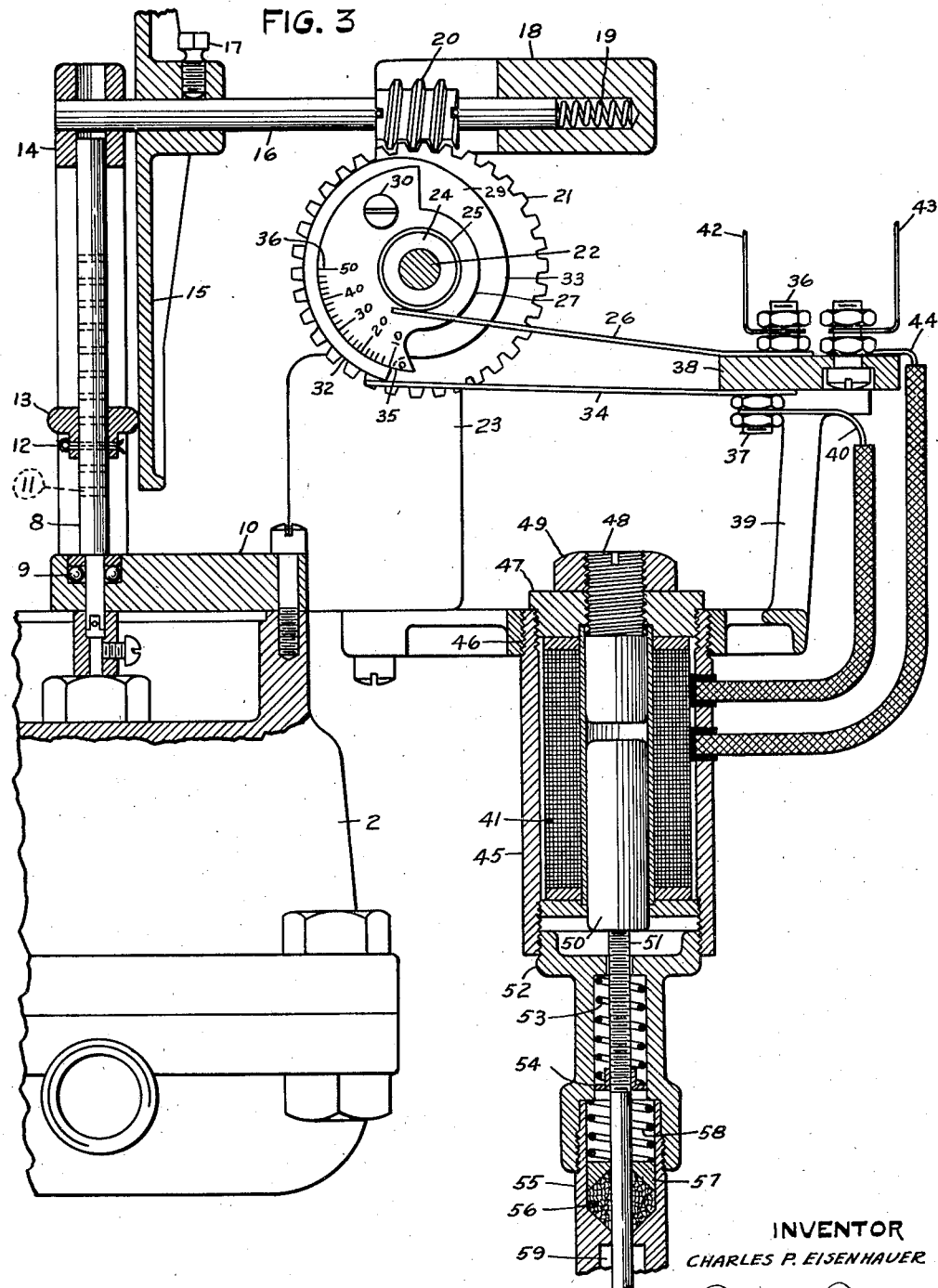

Dec. 18, 1928.
C. P. EISENHAUER
1,695,542
WATER SOFTENING APPARATUS
Filed July 22, 1925  9 Sheets-Sheet 4
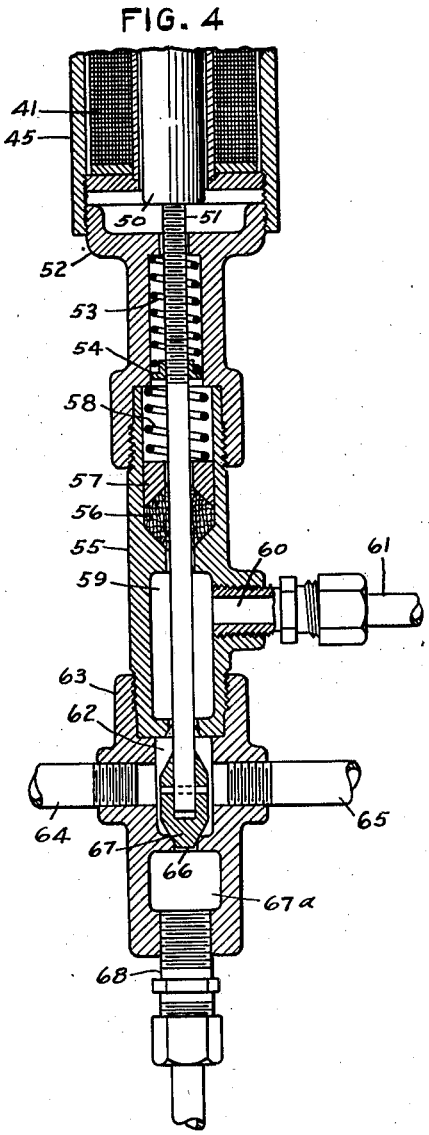
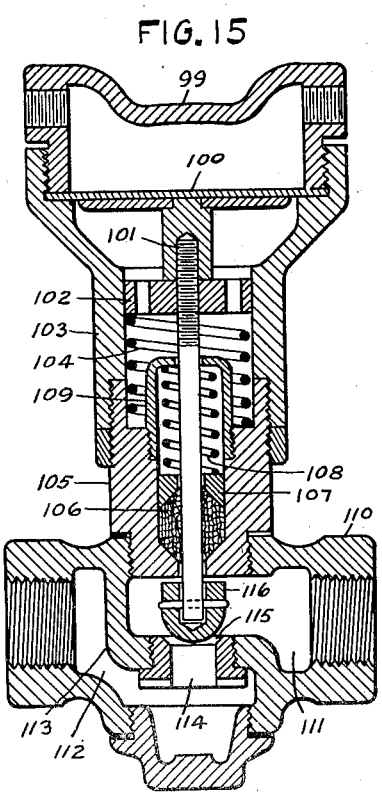
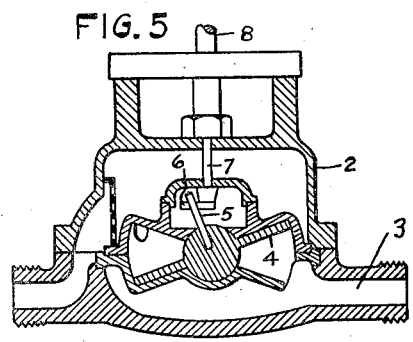
INVENTOR
CHARLES P. EISENHAUER
BY
ATTORNEYS Dec. 18, 1928.
C. P. EISENHAUER
1,695,542
WATER SOFTENING APPARATUS
Filed July 22, 1925  9 Sheets-Sheet 5
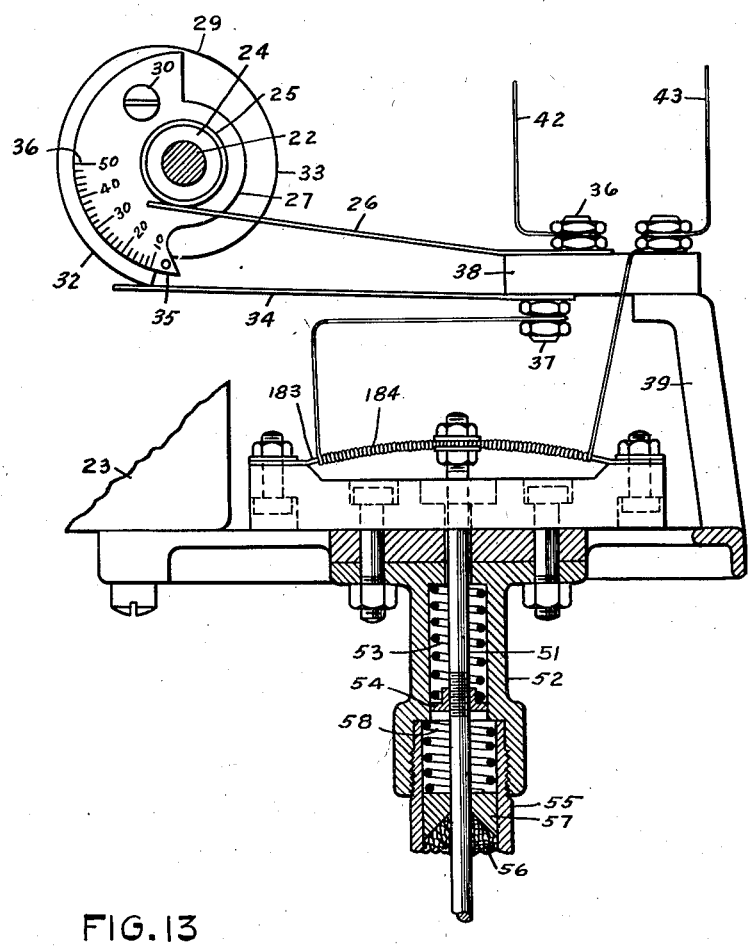
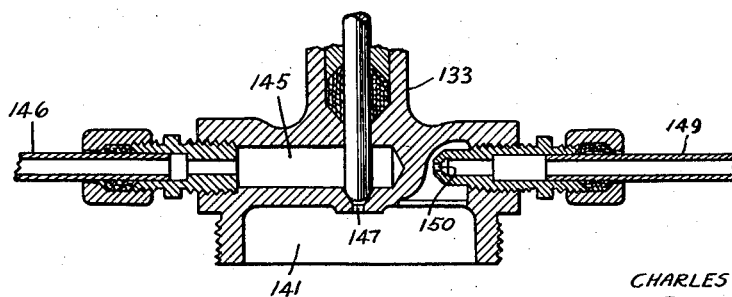
INVENTOR
CHARLES P. EISENHAUER
BY
ATTORNEYS

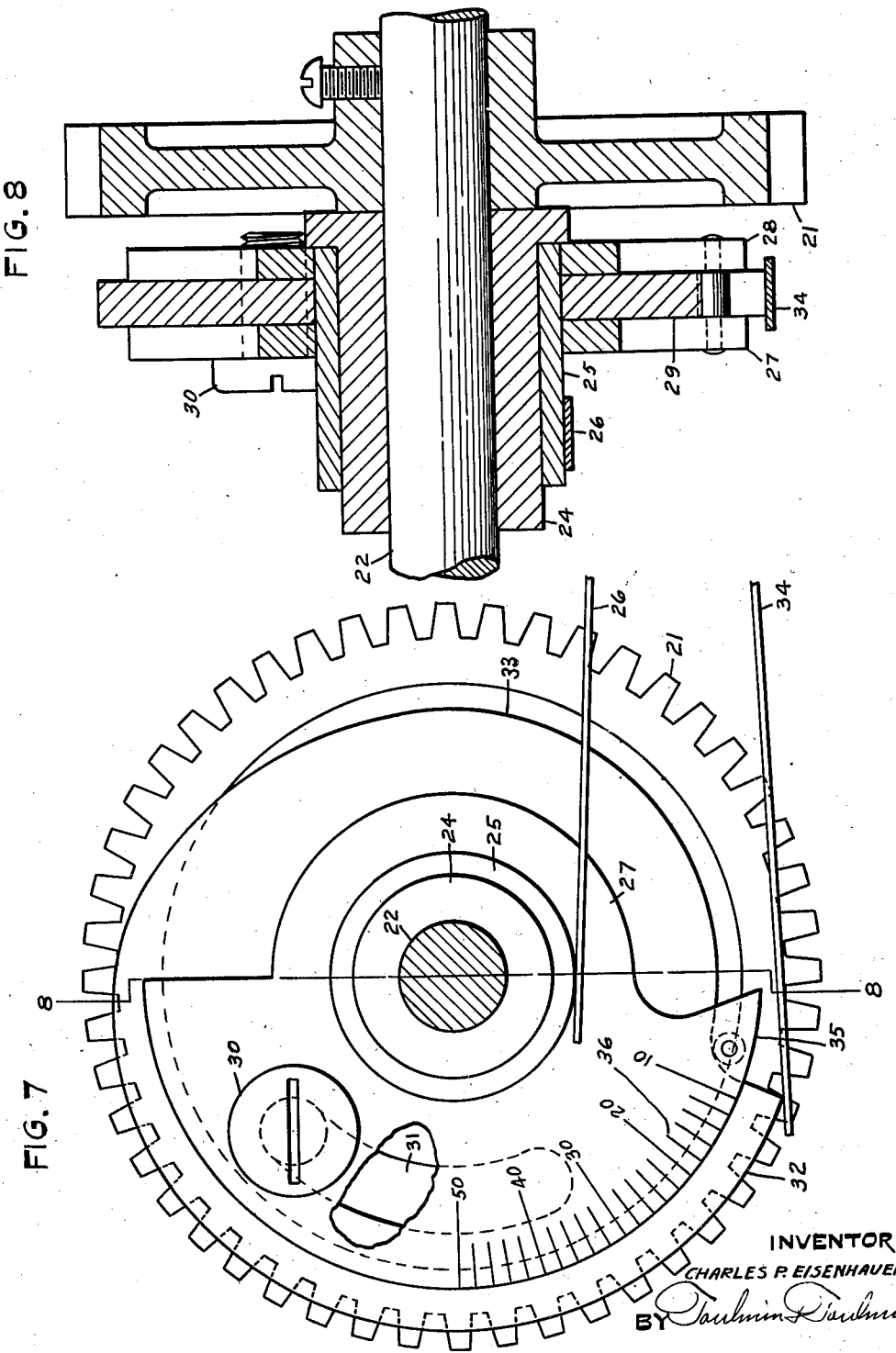

Dec. 18, 1928.  
C. P. EISENHAUER  
1,695,542  
WATER SOFTENING APPARATUS  
Filed July 22, 1925    9 Sheets-Sheet 7
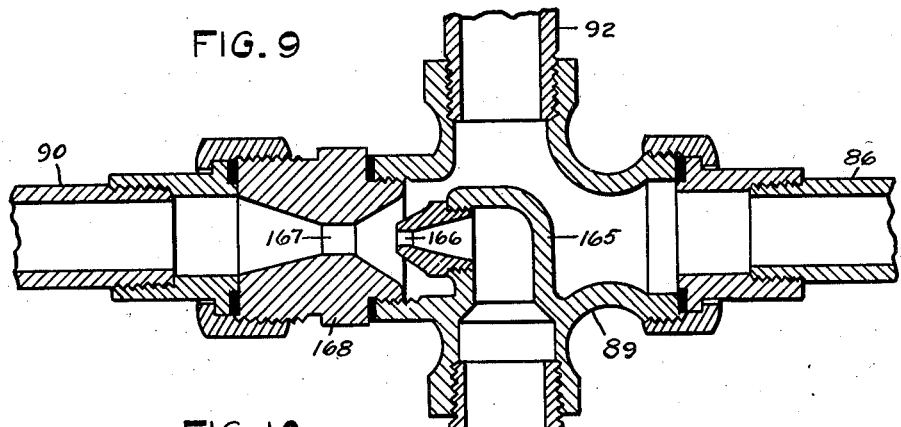
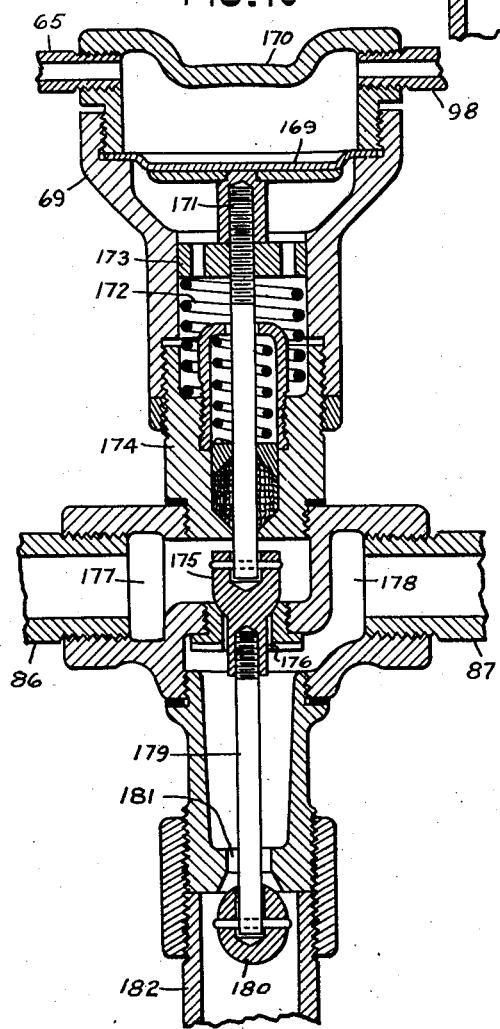
INVENTOR  
CHARLES P. EISENHAUER  
ATTORNEYS Dec. 18, 1928.  1,695,542
C. P. EISENHAUER
WATER SOFTENING APPARATUS
Filed July 22, 1925  9 Sheets-Sheet 8
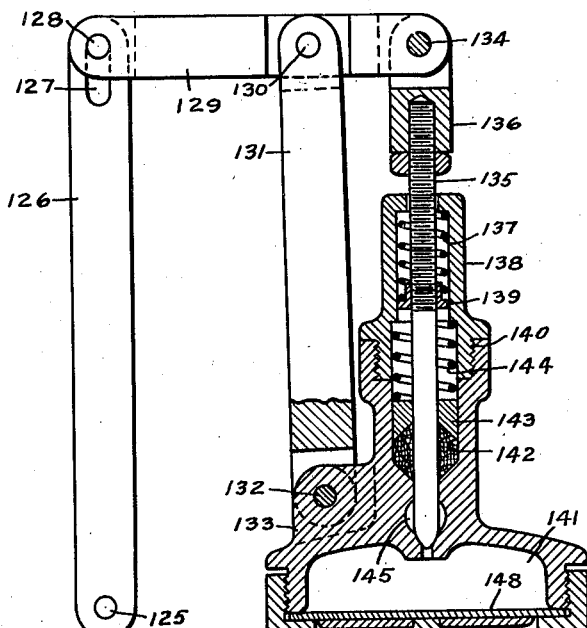
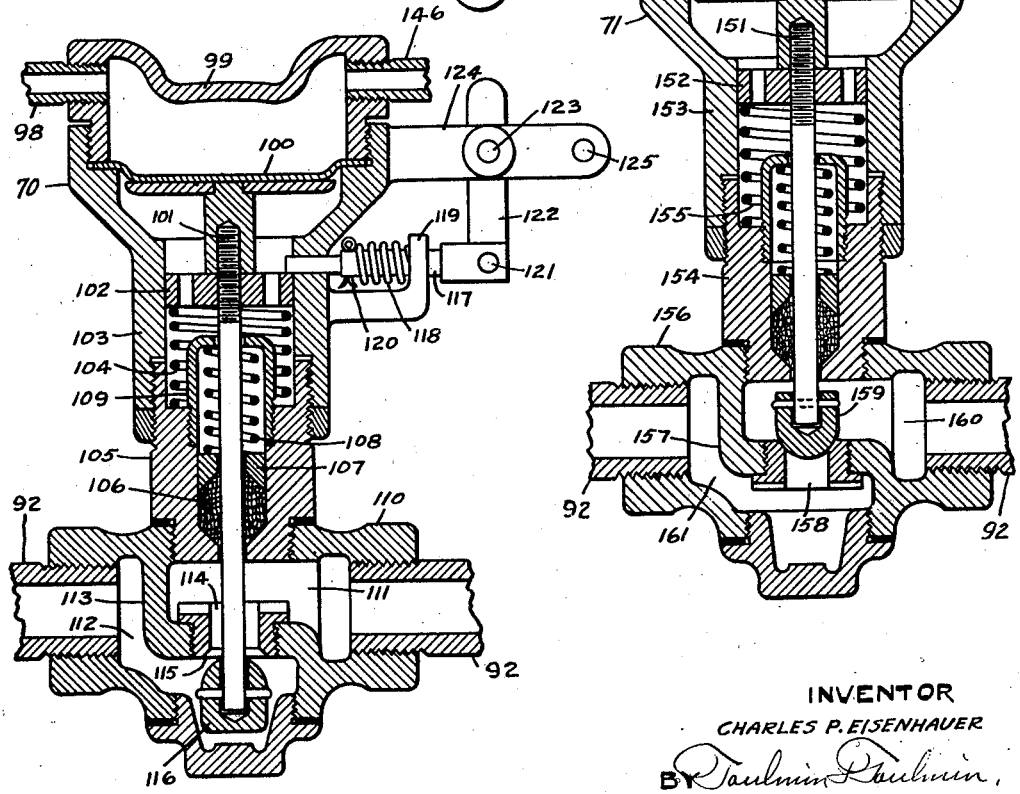
INVENTOR
CHARLES P. EISENHAUER
BY Toulmin Toulmin,
ATTORNEYS

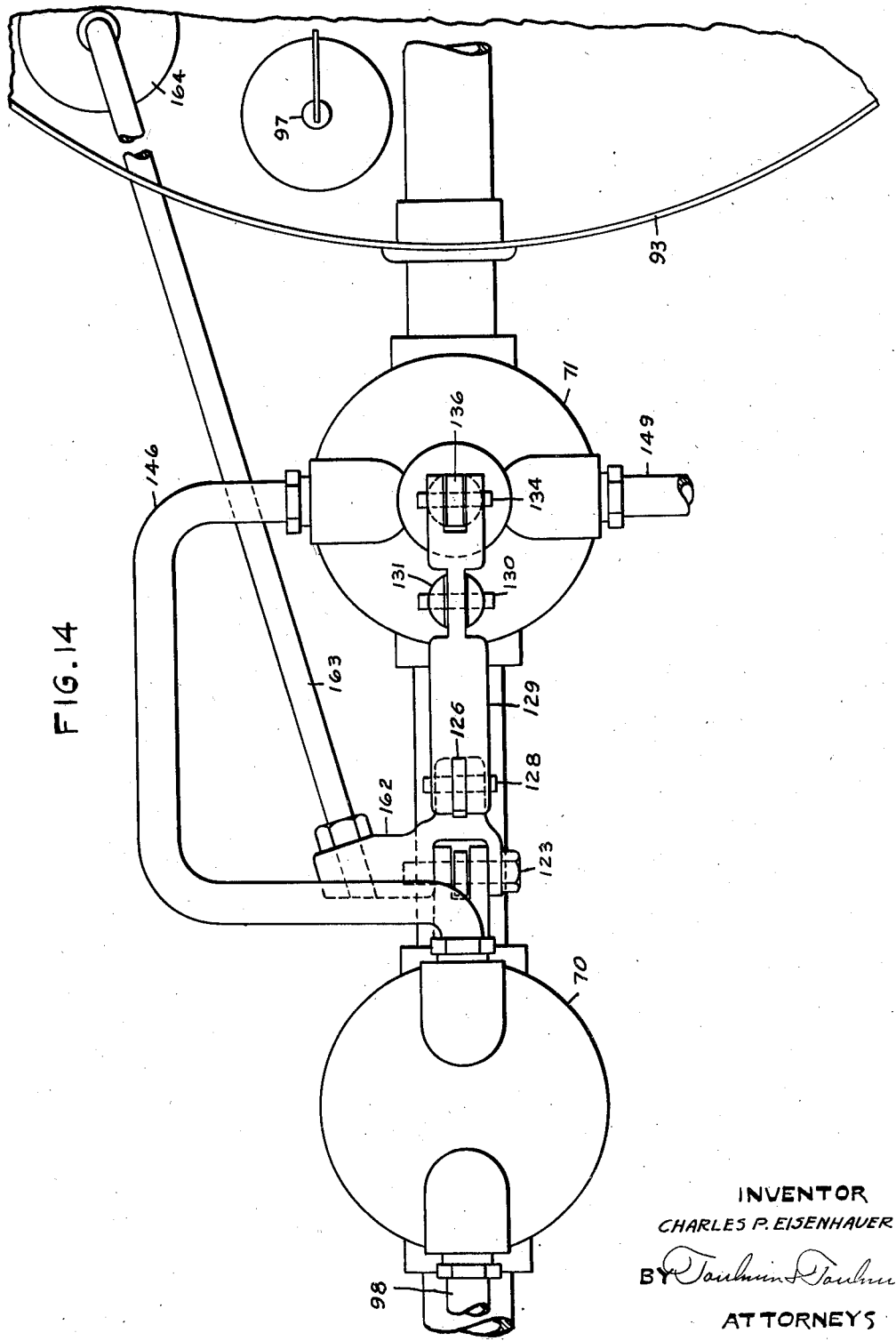

Patented Dec. 18, 1928.

1,695,542

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

WATER-SOFTENING APPARATUS.

Application filed July 22, 1925. Serial No. 45,154.

My invention relates to water softeners.

It is the object of my invention to provide an automatic water softening apparatus in which the periods of regeneration and softening are controlled by the quantity of water passing through the hard water inlet line.

In particular, it is my object to effect the control of the system through valves which are operated by hydrostatic pressure from the incoming hard water line, the application of such hydrostatic pressure being determined by a hydrostatic needle valve which is, in turn, operated by means actuated by the incoming hard water electrically.

It is a further object of my invention in such an automatic water softening apparatus, to provide for softening by upward flow, regeneration by downward flow, washing by downward flow, by the passing of hard water during regeneration to the service line and the automatic replenishment of the brine supply with fresh water. All of these operations, according to my invention, are controlled by valves hydrostatically operated from the main line pressure, so that the work is actually done by the main line pressure but the control work of the valves, which is relatively small in amount, is easily effected by the means operated by the incoming hard water, such as a meter which has sufficient power to move electrical contacts for rendering operative the controlling hydrostatic needle valve.

Referring to the drawings:

Figure 2 is a rear elevation partially in section of the meter and meter driving mechanism;

Figure 3 is a side elevation of the meter, meter driving mechanism and electrical control mechanism for the needle valve, a number of the parts being in section;

Figure 4 is a section through the needle control valve;

Figure 5 is a section through the meter;

Figure 6 is a view of a modified form of electrical operating mechanism for the needle valve;

Figure 7 is a detailed view in elevation of the contact cams controlling the operation of the electrical mechanism which operates the needle valve;

Figure 8 is a section on the line 8—8 of Figure 7;

Figure 9 is a section through the injector mechanism;

Figure 10 is a section through the by-pass valve mechanism;

Figure 11 is a section through the refill valve mechanism;

Figure 12 is a section through the brine valve mechanism;

Figure 13 is a section at right angles to the section of Figure 12 through the cap portion of the brine valve showing the arrangement of the inlet and exhaust ports for the hydrostatic pressure;

Figure 14 is a plan view of the brine valve, refill valve and float mechanism, and a portion of the brine tank;

Figure 15 is a section through a typical valve, such as a drain valve or a top or bottom pipe valve.

Figure 1:
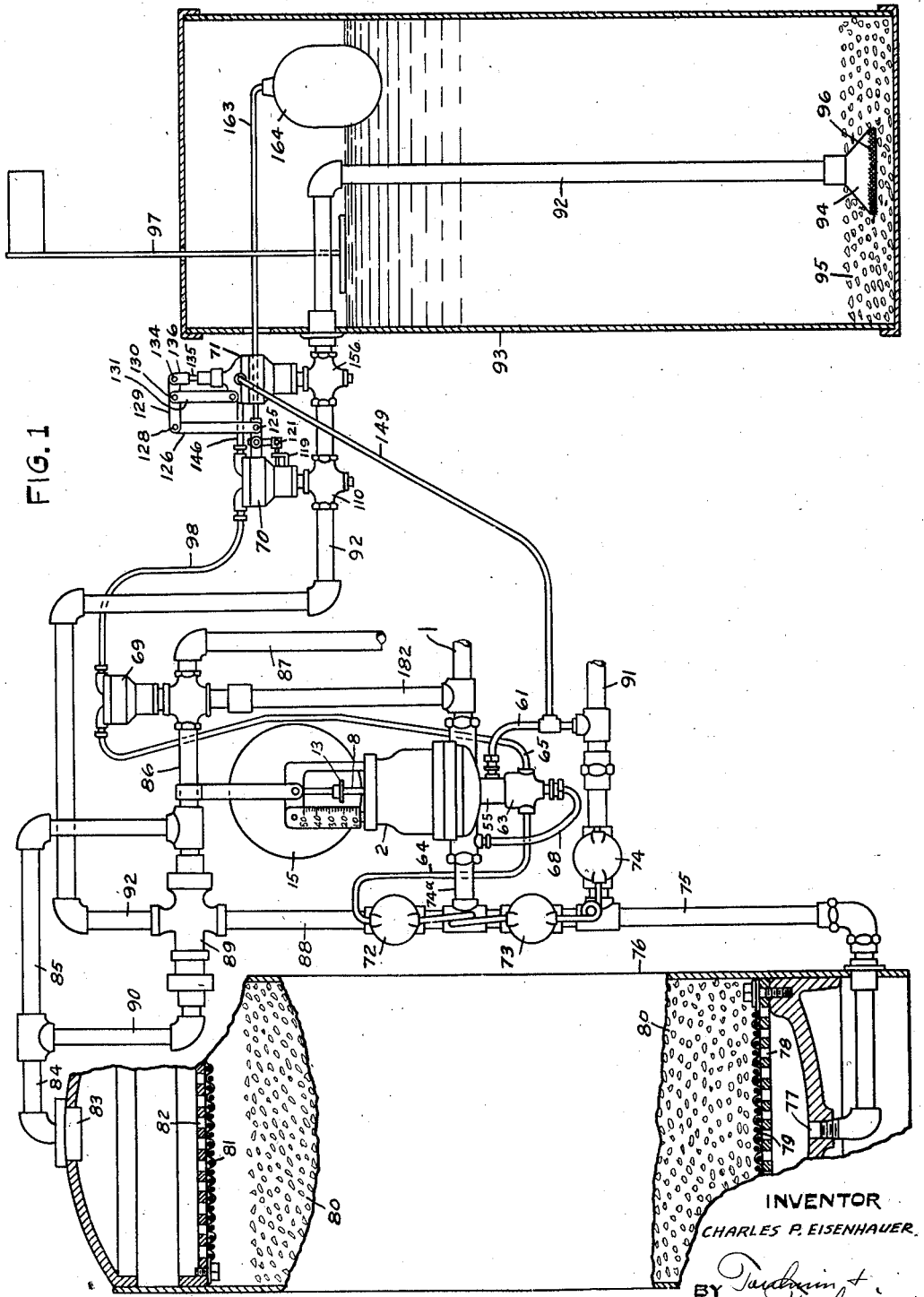
Figure 1 is a side elevation of the complete apparatus with a softening tank partially in section and with a brine tank in section.

In general, the operation of my apparatus is as follows:

The incoming hard water actuates a meter which, in turn, drives a cam mechanism. This cam mechanism is engaged by two contact fingers, one of which is continuously in engagement with a contact member and one of which is intermittently in engagement. A source of current is supplied to the electrical system so that when the cam members bring about contact with both fingers, the circuit is closed and a solenoid is energized to operate a hydrostatic needle control valve. This hydrostatic needle control valve is supplied with pressure from the incoming hard water line and permits that pressure, when it is open, to be applied to the plurality of valves which are operated thereby. These valves are operated in one direction by the hydrostatic pressure and in the other direction by such means as springs.

The hydrostatic valves are so arranged that when they are in their normal position with the pressure off of them, the hard water will pass to the bottom of the softening material, up through it and out to service, preferably by passing an injector mechanism which is used for drawing brine from the brine tank when regeneration takes place. When the electrical contacts are closed, the hydrostatic valve is open by the action of the solenoid, thus allowing hydrostatic pressure to be applied to the several valves. Thus, the water is diverted to the top of the tank of softening material, is sent downwardly and out the bottom to a drain. This upwardly passing water passes by the injector mechanism which draws salt water from a brine tank. The refill valve in the brine line is normally closed but is opened by this hydrostatic pressure. The salt valve in the brine line is normally open and is not affected by the hydrostatic pressure at this time. The salt water continues to be drawn from the salt tank until the float and float arm descend to a predetermined point in the salt tank. In the meanwhile, the refill valve has been locked open, the descent of the float opens the passage way of the hydrostatic pressure behind the brine valve and shuts it off. The hard water continues to flow into the top of the tank of softening material and out at the bottom to wash out the salt water. When this is accomplished, the contacts are broken, the needle valve closes, and the hydrostatic pressure is cut off to the valves, allowing them to close, but the refill valve is locked open and, due to the withdrawal of the hydrostatic pressure, the brine valve opens so that the brine line is again open.

As the water passes through the system to the service line during the first period of the softening, a small portion of the softened water is by-passed through the salt line to the salt tank to replenish it until it lifts the float and pulls the lock on the refill valve, allowing that valve to close when sufficient water has been restored to the salt tank.

Turning to the details of this mechanism, 1 is an incoming hard water line in which is located a meter 2. This meter 2 permits the water to pass in the passage way 3 to actuate the plate 4 which carries a pin 5. This pin rotates a lever or finger 6 carried on the end of the meter shaft 7. To this meter shaft 7 is connected a driving shaft 8 supported on ball bearings 9 in a support 10. The shaft 8 is provided with a pluralty of apertures 11 for receiving the cotter pin 12 which positions the driving member 13 carried on the shaft 8. The upper end of the shaft 8 is journaled in a frame 14. This driving member engages with a spring-pressed disc 15 mounted on the shaft 16 by the set screw 17. The shaft 16 is journaled at one end in the bracket 14 and at the other end in the bracket 18. Within the bracket 18 and between the bracket and the end of the shaft 16 is a helical spring 19 which presses the shaft and the disc 15 against the driving member 13. On the shaft 16 is mounted a worm 20. This worm engages with a gear 21. The gear 21 is mounted on a shaft 22 suitably journaled in the supporting bracket 23. On the shaft 22 is mounted a fiber bushing 24. On the bushing is mounted a brass contact sleeve 25 on which rides a contact finger 26 continuously. Also mounted on the brass contact sleeve are a pair of brass contact cam members 27 and 28 separated by a bakelite breaker cam disc 29 mounted upon the contact sleeve 25. The two members 27 and 28 are connected to the bakelite cam breaker disc 29 by a setscrew 30 working in a slot 31 in the bakelite disc. This bakelite disc has a high portion 32 and a low portion 33, so that when the low portion of the bakelite disc comes adjacent to the contact finger 34, the finger will be lowered from the surface of the bakelite disc 29 and allowed to engage with a portion of the high parts of the contact cam members 27 and 28 as at 35. The extent of this contact of the finger 34 with the portions 35 depends upon the amount of the portions 35 exposed. This is adjusted to determine the exact desired period of regeneration depending upon the pressure of the incoming water, the capacity of the softener and the hardness of the water to be softened. A scale 36 is used in this connection for determining the period of contact desired.

The contact fingers 26 and 34 are respectively connected to the terminals 36 and 37 on the insulating block 38 which is carried on the bracket 39. To the contact finger 37 is connected a line 40 which leads to the solenoid coil 41. The contact finger 26 is connected to one side of the line 42. The other side of the line 43 is connected to a wire 44 which, in turn, is attached to the solenoid 41. The casing of the solenoid designated at 45 is threaded at 46 into the bracket 39 to support it. Within this casing is threaded a cap member 47 containing the threaded plug 48 which is positioned by the nut 49. The armature of the solenoid is designated 50 and has connected to its lower end a valve stem 51 which works within the casing 52 of the valve. A spring 53 engages at one end with the casing and at the other end with the shoulder 54 provided on the valve stem, so as to yieldingly move the valve stem in one direction and move the armature with it. A spring-pressed packing is provided around the valve stem within the casing 55, such packing being designated 56, the packing washer 57 and the spring 58. The valve stem 51 passes into a chamber 59 in the casing, which is provided with a port 60 communicating with the drain pipe 61. This chamber 59 communicates with a chamber 62 within a casing 63 which is threaded on the casing 55. This casing 63 is provided with two outlet lines 64 and 65. The bottom of the chamber 62 has an aperture 66 which is adapted to be closed by a valve member 67 carried on the lower end of the valve stem 51. This opening 66 communicates with a chamber 67ª which, in turn, communicates with an inlet pressure pipe 68 that is directly connected with an incoming hard water line.

When the valve member 67 is lifted, the incoming hard water pressure is admitted to the pipes 64 and 65 for hydrostatically operating the valves, as will be hereinafter described. A line 65 passes to the by-pass valve 69 and thence to the refill valve 70 and to the salt valve 71. It does not operate the latter at this time because the hydrostatic pressure is not admitted to the salt valve until the float descends to a pre-determined point. The line 64 conveys pressure to open the top pipe valve 72, to close the lower pipe valve 73 and to open the drain valve 74. The hard water, during softening, passes through the pipe 74ª, through the lower pipe 75 to the bottom of the softener casing 76 as at 77, upward through the grating 78, screen 79 and softening material 80, through the upper screen 81, the grating 82 and out the top of the softener, as at 83.

The water normally passes through the pipe 84, pipe 85 to the service line 86 and out the pipe 87 to the system in the house or building. A portion may by-pass through the injector, as will be hereinafter described.

When the hydrostatic pressure is applied to the valves, the valve 72 is open and the valve 73 is closed so that the water passes through the pipe 74ª, up the pipe 88, through the injector casing 89, pipe 90, pipe 84 and downwardly through the softener and out through the pipe 75, passing the drain valve 74, which is now open, out the drain pipe 91.

This injector casing 89 is connected to a salt line 92 in which is located a refill valve 70 and the salt valve 71. This salt line terminates at the bottom of a salt tank 93 in a bell 94 beneath a bed of diffusing gravel 95. A screen 96 is provided on the bottom of the bell. The saturation of the salt by the liquid in the salt tank is connected by the indicating fly 97. By a brine valve 71, I mean the valve that controls the movement of brine from the brine tank. By refill valve 70, I mean the valve which controls the refilling of the brine tank with water.

The operation and the construction of the refill and salt valves, is as follows:—

The hydrostatic pressure is conveyed from the by-pass valve 69 to the refill valve 70 by the pipe 98. This pipe communicates with a pressure chamber formed by the cap 99 on the refill valve. The bottom of this chamber is provided with a diaphragm 100. The diaphragm is attached to the valve stem 101. On the valve stem is a piston 102 working within a cylinder 103 the top of which carries the diaphragm and the cap 99 of the refill valve. Beneath the piston 102 is a spring 104 which engages with the top of the cylindrical member 105 which is threaded into the casing 103. This spring 104 serves to maintain the valve closed and to resist the downward movement of the diaphragm 100. A packing 106 is located within the casing 105. This packing is kept into position by a washer 107 and a spring 108 retained within a cage 109. A coupling 110 is threaded on the bottom of the tubular member 105. This coupling is divided into two chambers 111 and 112 by a partition 113 which is provided with an aperture 114 and a valve seat 115. The valve stem 101 carries a valve member 116 which closes this aperture 114. The brine line communicates with the respective chambers 112 and 111.

This refill valve is locked open by a spring-pressed plunger 117 which is pressed into the casing 103 over the piston 102. The spring 118 engages with a bracket 119 at one end, which guides the plunger 117 and with a cotter pin 120 on the plunger 117 at the other end. This plunger is pivotedly connected at 121 with a bell crank 122 which, in turn, is pivotally mounted at 123 on the bracket 124. The free end of the bell crank 122 is pivoted at 125 to the slotted link 126. The upper end of this link is provided with a slot 127 in which works a pin 128. This pin is carried by a rocking arm 129 pivoted by 130 on a supporting member 131 which, in turn, is pivotedly supported by 132 on the top casing 133 of the salt valve.

The free end of the lever 129 is pivotedly connected at 134 to the needle valve stem 135 by the adjustable connecting link 136 This needle valve is normally spring-pressed downwardly by the spring 137 within the casing 138, one end of which engages the casing and the other end of which, a shoulder 139, on the needle valve. This casing 138 is threaded at 140 within the casing 133 which forms a cover of the hydrostatic chamber 141 of the salt valve. A packing 142 is within the casing 133 and is pressed into position by a washer 143 and the spring 144.

This casing 133 is provided with a transverse passage way 145. One end of this passage way communicates with a hydrostatic pressure line 146. The other end is provided with an aperture 147 to admit pressure into the hydrostatic chamber 141 for the diaphragm 148. Pressure is relieved from hydrostatic chamber 141 through the drain pipe 149 which has a restricted lead opening 150. This drain pipe 149 leads back to the drain pipe 61 which, in turn, leads to the drain pipe 91. The diaphragm 148 has connected thereto a valve stem 151 which carries a piston 152 in the casing 153. A tubular member 154 is threaded in the bottom of this casing and serves as a support over the spring 155, the other end of which engages with the piston 152. The lower end of the tubular member 154 carries a fitting 156. This fitting is provided with a partition 157 having an aperture 158 which is closed by the valve member 159, thus separating the chambers 160 and 161 which are communicated with by the brine line. The bell crank 122 carries an arm 162 in which is mounted a float arm 163 having a float 164.

The drain valve has the mechanism (shown in Figure 11) without the lock, the top pipe valve has a mechanism similar thereto, and the bottom pipe valve has a mechanism similar thereto, save that when the hydrostatic pressure is applied, the valve closes as in the case of the salt valve.

Referring to the injector mechanism, it will be noted that the hard water enters the injector casing 89 through the pipe 88, thence through a right angle nozzle 165 having a restricted orifice 166; through the restricted orifice 167 into the collar 168, thence into the pipe 90.

This serves to draw the brine from the brine tank through the brine line 92.

As to the by-pass valve, illustrated in Figure 10, its mechanism is similar to that in the other figures. A diaphragm 169 is provided beneath a cap 170. The diaphragm carries a valve stem 171 which is spring-pressed in one direction by the spring 172, which engages with a collar 173 on a valve stem and with a portion of the casing 174 at its other end. The lower end of the valve stem carries the valve member 175 closing and opening 176 between the chambers 177 and 178. The valve member 175 carries a supplementary stem 179, which has on its lower end a valve member 180 which closes and opens 181 when the valve stem is lifted and the opening 176 is open. This opening 181 communicates with a by-pass pipe 182, so that hard water may be passed directly from the hard water line to the service line 87.

Referring to Figure 6 which is a modified form of mechanism for electrically operating the needle control valve, instead of the solenoid of Figure 3, I attach to the upper end of the needle valve 51 an arch-shaped metal band 183 which has wound on it a coil of wire 184 to heat the band. Thus when the contacts are made this band is heated and expands due to the heating, lifting the needle valve and opening the valve. The connections are otherwise the same as that found in connection with the solenoid.

It will be further understood that I desire to comprehend within my invention such modifications as may be necessary to adapt it to varying conditions and uses.

Having thus fully described my invention, what I claim as new and desire to secure by Leters Patent, is:—

1. In an automatic water softening apparatus, a container for softening means, means to deliver hard water thereto, means to deliver regenerating material thereto, a source of regenerating material, a plurality of valves hydrostatically operated for controlling the period of softening and the period of regeneration, a control valve for said valves, electrical means for actuating said control valve and means actuated by the incoming water for rendering operative or inoperative said electrical means.

2. In an automatic water softening apparatus, a container for softening means, means to deliver hard water thereto, means to deliver regenerating material thereto, a source of regenerating material, a plurality of valves hydrostatically operated for controlling the period of softening and the period of regeneration, a control valve for said valves, electrical means for actuating said control valve and means actuated by the incoming water for rendering operative or inoperative said electrical means, said hydrostatically operated valves and control valve deriving their hydrostatic pressure from the incoming source of hard water.

3. In an automatic water softening apparatus, a container for softening means, means to deliver hard water thereto, means to deliver regenerating material thereto, a source of regenerating material, a plurality of valves hydrostatically operated for controlling the period of softening and the period of regeneration, a control valve for said valves, electrical means for actuating said control valve and means actuated by the incoming water for rendering operative or inoperative said electrical means, said hydrostatically operated valves and control valve deriving their hydrostatic pressure from the incoming source of hard water, said valves consisting or valves controlling the direction of the water to the top or bottom of the softener, a drain valve, a refill valve and a salt valve.

4. In an automatic water softening apparatus, a container for softening means, means to deliver hard water thereto, means to deliver regenerating material thereto, a source of regenerating material, a plurality of valves hydrostatically operated for controlling the period of softening and the period of regeneration, a control valve for said valves, electrical means for actuating said control valve and means actuated by the incoming water for rendering operative or inoperative said electrical means, means to by pass water from the hard water line to a service line during the period of regeneration, and a valve in said line to control the operation of said by-pass.

5. In an automatic water softening apparatus, a container for softening means, means to deliver hard water thereto to the bottom thereof, means to deliver regenerating material thereto at the top thereof, a source of regenerating material, a plurality of valves hydrostatically operated for controlling the period of softening and the period of regeneration, a control valve for said valves, and electrical means for actuating said control valve and means actuated by the incoming water for rendering operative or inoperative said electrical means.

6. In an automatic water softening apparatus, softening means, means to deliver hard water thereto, means to deliver regenerating material thereto, a source of regenerating material, a plurality of valves, hydrostatically operated for controlling the period of softening and the period of regeneration, a control valve therefor, electrical means for actuating said control valve and means actuated by the incoming water for rendering operative or inoperative said electrical means, means to flush the regenerating material from the softening means and means to replenish the source of regenerating material with a fresh supply of water.

7. In an automatic water softening apparatus, softening means, means to deliver hard water thereto, a service line connected thereto, a drain line, means to deliver brine thereto, a source of brine supply, a refill valve and a brine valve in said means to deliver brine, a lock for the refill valve, a float and float arm adapted to control the lock on the refill valve and the application of hydrostatic pressure to the brine valve, a drain valve and a pair of valves controlling the alternate movement of incoming hard water to either end of the softening means, an injector associated with the means to deliver water to one end of the softening means so that brine is drawn from the brine tank to the softening means, a needle valve adapted to control the application of hydrostatic pressure to said refill, brine, drain and water control valves, means actuated by the incoming hard water to make and break an electric circuit, and electrical means connected thereto adapted to control said needle control valve.

8. In an automatic water softening apparatus, softening means, means to deliver hard water thereto, a service line connected thereto, a drain line, means to deliver brine thereto, a source of brine supply, a refill valve and a brine valve in said means to deliver brine, a lock for the refill valve, a float and float arm adapted to control the lock on the refill valve and the application of hydrostatic pressure to the brine valve, a drain valve and a pair of valves controlling the alternate movement of incoming hard water to either end of the softening means, an injector associated with the means to deliver water to one end of the softening means so that brine is drawn from the brine tank to the softening means, a needle valve adapted to control the application of hydrostatic pressure to said refill, brine, drain and water control valves, means actuated by the incoming hard water to make and break an electric circuit, and electrical means connected thereto adapted to control said needle control valve, means to by-pass hard water to the service line during regeneration and a valve hydrostatically controlled by said needle valve to control said by-pass.

9. In an automatic water softening apparatus, a water line, means connected therewith and actuated by water passing through the water line, a plurality of electric contacts, one of which is continuous and the other of which is intermittent, actuated by said means, contact members engaging with said means, a solenoid connected therewith, a needle control valve controlling the application of hydrostatic pressure from the water line to a plurality of hydrostatic valves controlling the water softening system, adapted to be moved in one direction by said solenoid and in the other direction by a yielding means associated therewith, a plurality of valves adapted to be moved by hydrostatic pressure in one direction and by yielding means in the other direction, whereby hydrostatic pressure from said line is admitted or cut off to the plurality of valves.

10. In an automatic water softening apparatus, a water line, means connected therewith and actuated by water passing through the water line, a plurality of electric contacts, one of which is continuous and the other of which is intermittent, actuated by said means, contact members engaging with said means, a solenoid connected therewith, a needle control valve controlling the application of hydrostatic pressure from the water line to a plurality of hydrostatic valves controlling the water softening system, adapted to be moved in one direction by said solenoid and in the other direction by a yielding means associated therewith, a plurality of valves adapted to be moved by hydrostatic pressure in one direction and by yielding means in the other direction, whereby hydrostatic pressure from said line is admitted or cut off to the plurality of valves, said contact means consisting of a contact sleeve for continuous contact and a contact cam and a contact cam breaker.

11. In an automatic water softening apparatus, a water line, means connected therewith and actuated thereby, a plurality of electric contacts, one of which is continuous and the other of which is intermittent, actuated by said means, contact members engaging with said means, a solenoid connected therewith, a needle control valve adapted to be moved in one direction by said solenoid and in the other direction by a yielding means associated therewith, whereby hydrostatic pressure from said line is admitted to or cut off from a plurality of valves, said contact means consisting of a contact sleeve for continuous contact and a contact cam and a contact cam breaker, and means for adjusting the relative position of said contact cam breaker and contact cam.

12. In an automatic softening control apparatus, an incoming water line, a meter actuated thereby, a meter shaft, a driving member carried thereon, a disc driven thereby, a contact sleeve driven thereby, a contact cam and a contact cam breaker driven thereby, a pair of yielding contact fingers engaging with the sleeve continuously and with said contact cam intermittently respectively, a source of current connected to said fingers, a solenoid connected to said fingers, a needle valve connected to said solenoid, yielding means adapted to actuate said needle valve in one direction, it being actuated in the other direction by said solenoid.

13. In an automatic water softening apparatus, incoming hard water conveying means, means actuated thereby, electrical contacts actuated by said means, contact fingers continuously engaging with one of said contacts and intermittently engaging with the other, a heating element connected with said fingers, a source of current connected with said fingers, means for anchoring either end of said heating element so that its central portion may be permitted to expand, a needle valve for controlling hydrostatic pressure connected to the heating portion, whereby as the contacts are made and the circuits are closed the needle valve is actuated in one direction, and yielding means to move it in the other direction.

14. In an automatic water softening apparatus, a tank having softening means therein, an incoming hard water line, means to deliver water therefrom to either end of the tank, a drain attached to the lower line, valves in said lines to open and close them, an injector in the upper line leading to the upper end of the tank, a salt line connected therewith, a brine tank, a refill valve and a brine valve in said brine line, a float and float arm in said brine tank so arranged that when the float arm and float descend to the lowermost position they will admit hydrostatic pressure to the brine valve to close it and when it is in the uppermost position, it will unlock the refill valve, means operated by the incoming water to make and break electrical contacts, electrical means for operating a needle control valve connected therewith and to a source of current, a needle control valve, means for applying hydrostatic pressure controlled by said needle control valve to said valves heretofore mentioned, the parts being so arranged that during softening the brine tank will be replenished with a predetermined amount of salt so that before the refill valve closes upon the rising of the float and upon regeneration, salt water will be drawn from the salt tank through the softening material out the drain until the float descends to a predetermined point, whereupon a continuous flow of the water downward through the softening material will flush it of salt water.

15. In an automatic water softening apparatus, a tank having softening means therein, an incoming hard water line, means to deliver water therefrom to either end of the tank, a drain attached to the lower line, valves in said lines to open and close them, an injector in the upper line leading to the upper end of the tank, a salt line connected therewith, a brine tank, a refill valve and a brine valve in said brine line, a float and float arm in said brine tank, so arranged that when the float arm and float descend to the lowermost position they will admit hydrostatic pressure to the brine valve to close it and when it is in the uppermost position, it will unlock the refill valve, means operated by the incoming water to make and break electrical contacts, electrical means for operating a needle control valve connected therewith and to a source of current, a needle control valve, means for applying hydrostatic pressure controlled by said needle control valve to said valves heretofore mentioned, the parts being so arranged that during softening the brine tank will be replenished with a predetermined amount of salt so that before the refill valve closes upon the rising of the float and upon regeneration, salt water will be drawn from the salt tank through the softening material out the drain until the float descends to a predetermined point, whereupon a continuous flow of the water downward through the softening material will flush it of salt water, a by-pass from the hard water to the service line and a hydrostatically operated valve to control said by-pass so that hard water is furnished to the service line during regeneration.

16. In an automatic water softening apparatus, a tank having softening means therein, an incoming hard water line, means to deliver water therefrom to either end of the tank, a drain attached to the lower line, valves in said lines to open and close them, an injector in the upper line leading to the upper end of the tank, a salt line connected therewith, a brine tank, a refill valve and a brine valve in said brine line, a float and float arm in said brine tank, so arranged that when the float arm and float descend to the lowermost position they will admit hydrostatic pressure to the brine valve to close it and when it is in the uppermost position, it will unlock the refill valve, means operated by the incoming water to make and break electrical contacts, electrical means for operating a needle control valve connected therewith and to a source of current, a needle control valve, means for applying hydrostatic pressure controlled by said needle control valve to said valves heretofore mentioned, the parts being so arranged that during softening the brine tank will be replenished with a predetermined amount of salt so that before the refill valve closes upon the rising of the float and upon regeneration, salt water will be drawn from the salt tank through the softening material out the drain until the float descends to a predetermined point, whereupon a continuous flow of the water downward through the softening material will flush it of salt water, a by-pass from the hard water to the service line and a hydrostatically operated valve to control said by-pass so that hard water is furnished to the service line during regeneration, said valves being so arranged that the hydrostatic pressure behind them will be drained to the drain line when softening starts and yielding means in each of said valves to return them to their initial position.

17. In an automatic water softening apparatus, a tank containing water softening material, means for delivering hard water thereto, means operated thereby for determining the period of regeneration and softening, a plurality of valves controlling said operations controlled by said means, means controlled thereby for using hydrostatic pressure to operate said valves, an injector means for drawing regenerating material from a regenerating tank, and an enlarged by-pass around said injecting means for conveying the soft water to the service line during the softening period.

In testimony whereof, I affix my signature.

CHARLES P. EISENHAUER.